United States Patent [19]

Kobomura et al.

[11] Patent Number: 5,552,214
[45] Date of Patent: Sep. 3, 1996

[54] UNIDIRECTIONAL PREPREG AND CARBON FIBER REINFORCED COMPOSITE MATERIALS COMPRISING PITCH-BASED CARBON FIBERS AND POLYACRYLONITRILE-BASED CARBON FIBERS

[75] Inventors: Kenji Kobomura; Hiromi Kimura; Hideo Osone, all of Kawasaki; Mikio Shima, Kimitsu; Michiya Hayashida; Nobuyuki Tsuji, both of Kawasaki, all of Japan

[73] Assignees: Nippon Steel Corporation; Nippon Steel Chemical Co., Ltd., both of Tokyo, Japan

[21] Appl. No.: 433,599

[22] Filed: May 3, 1995

Related U.S. Application Data

[63] Continuation of Ser. No. 13,442, Feb. 4, 1993, abandoned.

[30] Foreign Application Priority Data

| | | | |
|---|---|---|---|
| Feb. 7, 1992 | [JP] | Japan | 4-022221 |
| Feb. 19, 1992 | [JP] | Japan | 4-031888 |
| Jun. 1, 1992 | [JP] | Japan | 4-140617 |
| Jun. 1, 1992 | [JP] | Japan | 4-140618 |

[51] Int. Cl.⁶ .............................. D04H 3/02; B32B 5/06; B32B 29/02; B05D 3/02
[52] U.S. Cl. ................... 428/294; 156/176; 156/178; 205/176; 427/372.2; 427/374.1; 428/297; 428/298; 428/302; 428/408; 428/902
[58] Field of Search ..................... 428/297, 902, 428/408, 294, 298, 302; 205/176; 427/372.2, 374.1; 156/176, 178

[56] References Cited

U.S. PATENT DOCUMENTS

| | | | |
|---|---|---|---|
| 4,808,481 | 2/1989 | Luxon | 428/408 |
| 4,868,050 | 9/1989 | Tanaka et al. | 428/335 |
| 5,171,419 | 12/1992 | Wheeler et al. | 205/176 |

FOREIGN PATENT DOCUMENTS

| | | |
|---|---|---|
| 62-199439 | 9/1987 | Japan. |
| 3-2225 | 1/1991 | Japan. |
| 3-2226 | 1/1991 | Japan. |
| 3-2227 | 1/1991 | Japan. |
| 3-2224 | 1/1991 | Japan. |

OTHER PUBLICATIONS

A Study of the Adhesion of Carbon Fiber and Glass Fiber Reinforced Epoxy Resin and its Fracture Mechanics pp. 107–113.

Carbon Fiber Directory, Pummac Directories Limited, CT 7, CT 16, CT 19, CT 23.

Journal of Materials Science, 27 (1992) 3782–3788.

English translation of Official Letter of Taiwan Patent Office (National Bureau of Standards) in Taiwan Appln. No. 82100814.

*Primary Examiner*—James Withers
*Attorney, Agent, or Firm*—Kenyon & Kenyon

[57] ABSTRACT

A pitch-based carbon fiber reinforced composite material is improved with regard to its compressive strength and compression strain at failure by combining polyacrylonitrile-based carbon fibers. The pitch-based carbon fibers have a modulus in tension of not less than 400 GPa, a tensile strength of not less than 2000 MPa, a compressive strength as a unidirectionally reinforced composite material of 100 MPa to 800 MPa and a fiber diameter of 4 μm to 15 μm and the polyacrylonitrile-based carbon fibers have a modulus in tension of not less than 200 GPa, a compressive strength and compression strain at failure as a unidirectionally reinforced composite material larger than those of the pitch-based carbon fibers, and a fiber diameter smaller than that of the pitch-based carbon fibers.

8 Claims, 3 Drawing Sheets

UNIDIRECTIONAL PREPREG AND CARBON FIBER REINFORCED COMPOSITE MATERIALS COMPRISING PITCH-BASED CARBON FIBERS AND POLYACRYLONITRILE-BASED CARBON FIBERS

This application is a continuation of application Ser. No. 08/013,442 filed Feb. 4, 1993 now abandoned.

BACKGROUND OF THE INVENTION

1. Field of the Invention

The present invention relates to a unidirectional prepreg, carbon fiber reinforced resin composite materials, and processes for producing the sames.

2. Description of the Related Art

Carbon fiber reinforced resin composite materials (hereinafter referred to as "CFRP") are light weight and have a high specific strength and high specific modulus and are utilized in various fields including sports and leisure products, aerospace structures, general industrial machines, etc.

CFRPs are produced from carbon fibers using a filament winding method, prepreg lamination method, pultrusion method or the like, but the prepreg method is predominately used to obtain high performance CFRPs.

Prepregs are an intermediate sheet material obtained by impregnating carbon fibers with an uncured resin such as an uncured epoxy resin, and a number of such prepregs are laminated followed by heating and pressing the laminate to form same into a specific shape. This is the prepreg lamination method.

Unidirectional prepregs with carbon fibers unidirectionally arranged are predominately used to obtain a high performance CFRP, because cloth prepregs, in which carbon fibers are woven and braid prepregs in which carbon fibers are braided, do not perform adequately due to the undulation of fibers and local stress concentration caused thereby.

At present PAN-based carbon fibers produced from polyacrylonitrile (PAN) as a starting material are currently used as the carbon fibers in CFRPs. Nevertheless, the PAN-based carbon fibers are expensive because the polyacrylonitrile fibers as a starting material are expensive and the yield of carbonization is low; accordingly, the application of PAN-based carbon fibers is limited to aircraft and airospace products, and sports and leisure products, etc.

On the other hand, pitch-based carbon fibers produced from carbonaceous pitch as a starting material have the advantage of being low in price because the starting material is inexpensive and the yield of carbonization is high. Particularly, mesophase pitch-based carbon fibers produced from mesophase pitches containing more than 40%, preferably 60% of mesophase have attracted attention as they are inexpensive and provide a high performance carbon fiber.

It is known that mesophase pitch-based carbon fibers may have a high modulus because a highly oriented and highly graphitized carbon fiber can be easily produced by utilizing the orienting and graphitizing properties of a mesophase pitch as the starting material. For example, a mesophase pitch based carbon fiber with carbon layer planes three dimensionally developed, is highly graphitized and has a high modulus, and a process for producing the same, are disclosed in JP-A-49-19127.

Nevertheless, it was reported that CFRPs using mesophase pitch-based carbon fibers (hereinafter referred to as "pitch-based carbon fiber(s)") have a relatively low compressive strength compared to its tensile strength and that as the modulus of a pitch-based carbon fibers is increased, the compressive strength of the fibers is reduced. Accordingly, improvement of the compressive strength of the pitch-based carbon fibers is essential for applying the pitch-based carbon fibers to primary structural materials. The above are particularly applicable when pitch-based carbon fibers having a modulus in tension of 400 GPa or more are used in a CFRP.

As reported in Journal of Materials Science, 27, 3782(1992), it was recently revealed that the compressive stress-strain curve of a unidirectional CFRP using high modulus carbon fibers has non-linearity in that the slope of the curve gradually decreases as the strain increases. Generally, for pitch-based carbon fibers having a modulus in tensile of 400 MPa or more, the slope of the compressive-stress-strain curve decreases to about 60% of the initial slope when failure occurs due to compression. Accordingly, it is considered that in a compressive strength measurement using planer plates, the test piece fails in the mode of shear buckling or the like so that the compressive strength and compression strain at failure are measured to be small.

In the case of the above-mentioned pitch-based carbon fibers, the tensile strength of the fibers is not less than 2000 MPa but the compressive strength of the unidirectional CFRPs is not more than 800 MPa.

The hybrid method, in which different fibers are combined, is known to improve the physical properties of a weaker carbon fiber. For example, JP-B-02-42098 published in 1991 discloses an improvement of the bending strength of the weaker carbon fiber reinforced plastics by combining stronger grade carbon fibers for reinforcement, but the description of the fiber dispersion of the weaker and stronger fibers and the specific methods of production are not disclosed. It also mentions that reinforcement fibers should advantageously have a diameter as large as possible.

JP-A-02-292337 published in 1992 discloses an improvement of the bending strength of carbon fibers by uniformly dispersing additional different fivers having high compressive strength carbon fibers. It also affirms that uniform dispersion of the carbon fibers and the addition of fibers other than carbon fibers are essential for improving the compressive strength.

JP-A-02-292337 also confirms that the so-called in-layer hybrid in which regions of carbon fibers and regions of different fibers (non-carbon fibers) adjacent to each other are arranged in a layer and the so-called interlayer hybrid in which carbon fiber layers and different fiber layers are laminated, but in these hybrids, the fibers are broken at low strain values and improvement of the compressive strength of the hybrids is thus insufficient.

Accordingly, uniform dispersion of large diameter fibers is essential for improving the compressive strength of carbon fibers by the hybrid method. An apparatus for attaining such uniform dispersion and productivity thereof rendered the hybrid fibers expensive and the necessary large diameter fibers made the thin prepregs, necessary for the production of fishing rods or golf shafts, difficult.

The object of the present invention is to provide CFRPs capable of enduring repeated loads and having an improved compressive strength and a unidirectional, if necessary thin prepreg for providing such a CFRP.

SUMMARY OF THE INVENTION

To attain the above and other objects of the present invention, in accordance with the first aspect of the present invention, there is provided a unidirectional prepreg comprising at least one bundle of (A) pitch-based carbon fibers and at least one bundle of (B) polyacrylonitrile-based carbon fibers arranged unidirectionally and adjacent to each other and a resin impregnated to said at least one bundle of pitch-based carbon fibers (A) and at least one bundle of polyacrylonitrile carbon fibers (B), said pitch-based carbon fibers having a modulus in tension of not less than 400 GPa, a tensile strength of not less than 2000 MPa, a compressive strength as a unidirectionally reinforced composite material of 100 MPa to 800 MPa, and a fiber diameter of 4 µm to 15 µm; said polyacrylonitrile-based carbon fibers (B) having a modulus in tension of not less than 200 GPa, a compressive strength and compression strain at failure as a unidirectionally reinforced composite material higher than those of said pitch-based carbon fibers (A), and a fiber diameter smaller than that of said pitch-based carbon fibers (A).

There is also provided a CFRP produced by laminating the above unidirectional prepregs and forming same into a specific shape.

In another aspect of the present invention, there is also provided a carbon fiber reinforced resin composite material made of a laminate of unidirectional prepregs comprising (A) pitch-based carbon fibers and unidirectional prepregs comprising (B) polyacrylonitrile-based carbon fibers; said pitch-based carbon fibers having a modulus in tension of not less than 400 GPa, a tensile strength of not less than 2000 MPa, a compressive strength as a unidirectionally reinforced composite material of 100 MPa to 800 MPa, and a fiber diameter of 4 µm to 15 µm; said polyacrylonitrile-based carbon fibers (B) having a modulus in tension of not less than 200 GPa, compressive strength and compressive strain at failure as a unidirectionally reinforced composite material higher than those of said pitch-based carbon fibers (A), and a fiber diameter smaller than that of said pitch-based carbon fibers (A).

The present invention also provides a process for producing the above unidirectional prepreg and processes for producing the above CFRPs.

BRIEF DESCRIPTION OF THE INVENTION

DETAILED DESCRIPTION OF THE INVENTION

The modulus in tension of a fiber stated in the present invention is a value obtained by the resin impregnated strand method defined in JIS R7601. The compressive strength of a unidirectionally reinforced composite material stated in the present invention is obtained by reducing the results of the compressive test in accordance with the so-called Cellanese method defined in ASTM D3410A to the fiber volume percent of 60%. Here, the unidirectionally reinforced composite material comprises a rectangular plate composite material in which carbon fibers are placed unidirectionally along the one edge. The compression strain at failure stated in the present invention is a value measured by a strain gage attached to the test piece in the compression test.

In the unidirectional prepreg in accordance with the present invention, since the reinforcement fiber having a diameter smaller than that of the pitch-based carbon fiber is used and effective, thin prepregs can be easily produced and larger diameter fibers or partially bonded fibers are not necessary for reinforcement.

In this unidirectional prepreg, the reinforcement effect is effective even if the two types of fibers are not uniformly distributed and the properties of the prepreg are improved beyond those of a prepreg in which the reinforcement fibers are uniformly dispersed as in JP-A-02-292337, because the pitch-based carbon fibers (A) tend to be damaged due to extreme brittleness by the production method of the prepreg of JP-A-02-292337 so that the tensile and compressive strengths are lowered.

The prepreg of the present invention can be produced using a conventional apparatus without any special apparatus, and the productivity thereof can be high since a special apparatus is not required, and further, no unnecessary damage occurs thereby deteriorating the properties thereof.

The method of producing the prepreg in accordance with the present invention is described with reference to the drawings.

Figure 1:
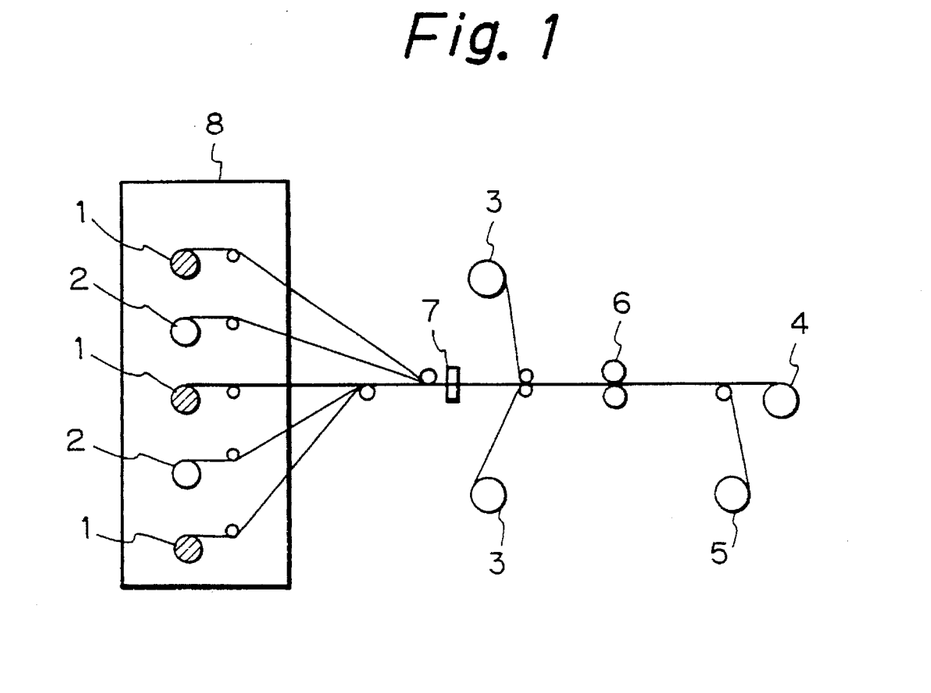
FIG. 1 schematically shows the production of a prepreg of one aspect of the present invention.

FIG. 1 schematically shows the production of the prepreg of the present invention. In FIG. 1, 1 denotes bundles of carbon fibers A and 2 denotes bundles of carbon fibers B. The bundles of carbon fibers A and B are preferably a simple assembly of filament carbon fibers.

The number of carbon fibers in a bundle may be selected depending on the conditions of the apparatus or production, but is generally about 500 to about 24000. The bundles of carbon fibers are preferably those assembled with a sizing agent for easy handling.

Figure 2:
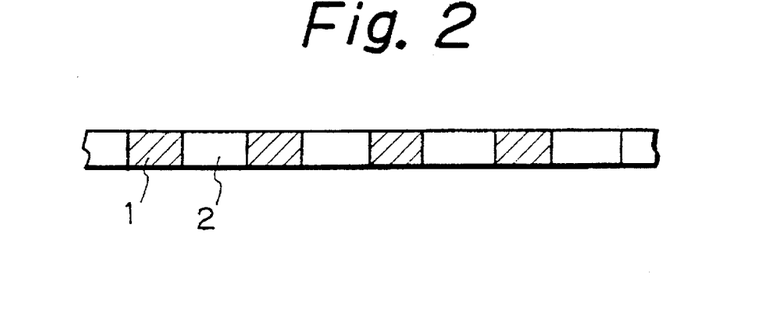
FIG. 2 and 3 are cross sectional views of a prepreg showing a combination of carbon fiers (A) and (B).
Figure 3:
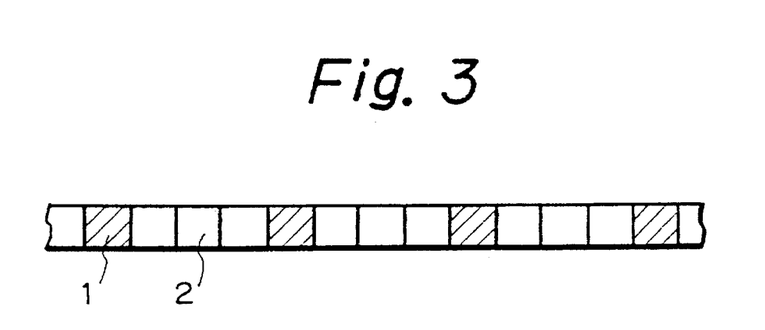

A required number of bobbins wound with the carbon fiber bundles 1 and carbon fiber bundles 2 are set on a creel stand 8, from which the carbon fiber bundles 1 and 2 are released and drawn and arranged into a predetermined width with a comb 7 and rolls 6, and the carbon fiber bundles 1 and carbon fiber bundles 2 are arranged in a predetermined combination. For example, the carbon fiber bundles 1 and the carbon fiber bundles 2 are alternately disposed, as shown in FIG. 2. It should be noted however that such an alternate arrangement is not essential and a combination of one carbon fiber bundle 1 and three carbon fiber bundles 2, as shown in FIG. 3, for example, is also possible.

This combination of the carbon fiber bundles 1 and 2 may be optionally selected depending on the required properties, particularly the compressive strength of the prepreg or CFRP.

The ratio R of fiber volume percents of the carbon fiber bundles 1 and 2 is expressed by the following formula:

$$R = \frac{T_1 D_2}{T_2 D_1} \cdot r_{1/2}$$

where $T_1$ and $T_2$ are the mass per unit bundle length of the carbon fiber bundles 1 and 2 respectively, $D_1$ and $D_2$ are the specific gravities of the carbon fiber bundles 1 and 2 respectively, and $r_{1/2}$ is the ratio of the number of the carbon fiber bundles 1 to the number of the carbon fiber bundles 2. R is determined by the compressive strength required in the direction of the fiber axis.

Once arranged with the comb 7, the carbon fiber bundles 1 and 2 together with resin coated papers 3 pass between hot press rolls 6 where the uncured resin coated on the resin coated papers 3 is impregnated in the fiber bundles. The resin coated paper 3 is a releasing paper on which a hot melt type uncured thermosetting resin is previously coated.

The thermosetting resin is usually an epoxy resin combined with a curing agent but unsaturated polyester resins, phenolic resins, polyamide resins, etc., combined with a curing agent may also be used if necessary. Also, an epoxy resin modified with a polyamide resin, a phenolic resin, a rubber component, or the like may also be used. This matrix resin of the prepreg may be selected optionally depending on the application thereof.

A number of carbon fiber bundles in which an uncured resin was impregnated by the hot press rolls 6 constitute a prepreg which is then wound up on a mandrel 4. The papers 3 are removed from the prepreg and wound-up on a mandrel 5 before the wind-up.

The carbon fiber A used in the present invention is a pitch-based carbon fiber, has a modulus in tension of not less than 400 GPa, preferably not less than 450 GPa, has a tensile strength of not less than 2000 MPa, has a compressive strength as a unidirectional reinforced composite material of 100 MPa to 800 MPa, and has a fiber diameter of 4 µm to 15 µm.

The pitch-based carbon fiber A having a modulus in tension may attain a tensile strength of not less than 2000 MPa, which is sufficient for use as a structural material, but even in such a case, the compressive strength thereof is extremely low compared to the tensile strength, at most 800 MPa. The pitch-based carbon fiber having such mechanical properties can be reinforced by the carbon fiber B, as described below, since in the stress-strain curve of the pitch-based carbon fiber, the slope at failure of the fiber is reduced to less than 60% of the slope at the initial stage.

The used pitch-based carbon fiber A has a diameter of 4 µm to 15 µm, preferably 7 µm to 11 µm. If the diameter is more than 15 µm, handling of the fibers is disadvantageous and due to lack of flexibility, the production of golf shafts or fishing rods is difficult. A pitch-based carbon fiber having a diameter of less than 4 µm is difficult to produce.

The lower limit of the compressive strength of the carbon fiber A is not particularly limited but a carbon fiber A having a compressive strength as a unidirectionally reinforced CFRP of not less than 100 MPa, preferably not less than 200 MPa is used to attain a reinforced fiber having a compressive strength sufficient as a structural material. Here, "the unidirectionally reinforced CFRP" is a plate of carbon fiber reinforced plastics in which the carbon fibers are placed unidirectionally.

The carbon fiber B used to reinforce the carbon fiber A is preferably a carbon fiber from the viewpoint of the balance of properties and must have a compressive strength and strain at compression failure, as a unidirectionally reinforced CFRP, higher than those of the carbon fiber A. Any carbon fiber that satisfy the above conditions may be used but PAN-based carbon fibers produced from polyacrylonitrile as a starting material are particularly used in the present invention because of their properties.

The carbon fiber B should preferably have a tensile modulus of not less than 200 GPa so as to be balanced with that of the carbon fiber A.

The carbon fiber B should preferably have a fiber diameter smaller than that of the carbon fiber A. In the present invention, the reinforcing carbon fiber does not necessarily have a fiber diameter larger than that of the carbon fiber to be reinforced as in JP-B-02-42098. As a result, the carbon fiber B having a smaller diameter than the carbon fiber A is used to permit the production of a thin flexible prepreg.

The method of producing the prepreg is not limited to the above and may be any one that allows a combination of the carbon fiber bundles 1 and 2. For example, the wet process in which carbon fiber bundles are dipped in a solution of an uncured resin in a solvent and dried to impregnate the resin may be used.

Also, all carbon fiber bundles are not necessarily arranged at the same time and, for example, using a drum winder, one or a number of carbon fiber bundles may be wound-up onto the drum to produce the prepreg.

The above prepreg of the present invention can be used to produce a CFRP by laminating and forming. Namely, the prepregs of the present invention are cut into a predetermined size, laminated at a predetermined alignment angle, and formed into a desired shape by heating and pressing in an autoclave or hot press roll.

The manner of lamination of the prepregs is not particularly limited and may be selected depending on the design, etc. For example, quasi-isotropic lamination, unidirectional, and ±45° laminations may be used. Nevertheless, it is preferred that when two or more prepregs are laminated in the same direction, the same carbon fiber bundles do not overlap each other so that the reinforcement efficiency is not lowered.

The shape of a shaped body made of the fiber reinforced resin composite material (CFRP) may be a planer, cylindrical, or three dimentional shape, which is obtained by the lamination and formation of the prepregs. The fiber alignment angle and thickness of the composite material may be determined depending on the required performances of CFRP.

By forming a CFRP from the unidirectional prepreg of the present invention, both the compressive strength and the compression strain at failure, in the direction of the fiber axis, of a unidirectional CFRP using high modulus pitch-based carbon fibers can be improved. Since the carbon fibers A are sustained without failure until the whole CFRP fails during compression, the CFRP is capable of enduring repeated loads. These effects of the present invention are attained without the necessity of uniform dispersion of the reinforcing fibers or use of reinforcing fibers having a diameter larger than that of the fiber to be reinforced.

The reasons of the above are not completely clear but may be considered as follows:

According to recent studies, it is reported that the compression stress-strain curve of a unidirectional CFRP using the carbon fibers A has nonlinearity in that the slope of the curve decreases as the strain increases (see, for example, Journal of Material Science, 27, 3782(1992)). As a result, in the compression test of a planer plate in accordance with the Cellanese method, the test piece is broken in the mode of shearing buckling, etc. so that the compressive strength and strain at failure are measured to be small.

In other words, it is considered that the inherent compressive strength and compressive strain at material failure are larger than the values obtained in the compression test using a planer plate. Accordingly, by supporting the carbon fibers A with the carbon fiber having a larger compressive strength and compressive strain at failure, it is believed that the inherent compressive strength and compressive strain at material failure are more easily displayed.

Figure 4:
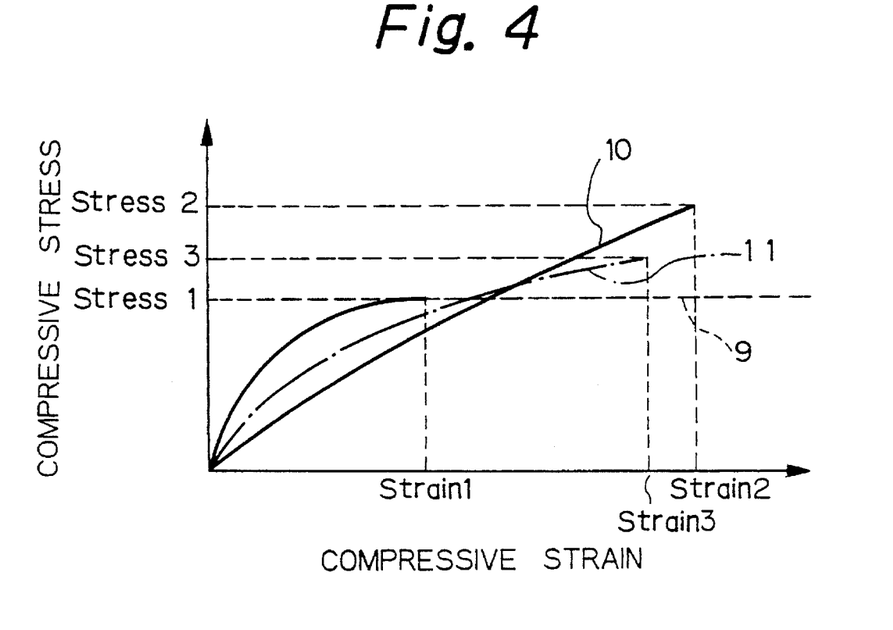
FIG. 4 is a stress-strain curve of unidirectional CFRPs under compression.

FIG. 4 shows this relationship. FIG. 4 shows, as an example, the stress-strain curves for the compression of CFRPs. In FIG. 4, 9 denotes a curve of a CFRP using only the carbon fiber A, 10 denotes a curve of a CFRP using only the carbon fiber B, and 11 denotes a curve of a CFRP using the carbon fibers A and B in a volume ratio of 1:1 (R=1), for example.

The curve 9 exhibits nonlinearity and, as a result, the test piece fails at the strain 1 (and stress 1) in the compression test of a planer plate of a CFRP using only carbon fibers A using the Cellanese method. Carbon fibers B (curve 10) do not exhibit nonlinearity and are broken at the point of stress 2 and strain 2. In the case of a CFRP using mixed carbon fibers A and B, the carbon fibers A sustain without failure up to a strain of 3, intermediate of strains 1 and 2; at strain 3 the carbon fibers B are broken and thus the whole of the CFRP is broken. The stress 3 is also intermediate of stresses 1 and 2.

Although there are some carbon fibers other than the carbon fiber A exhibiting negative nonlinearity in compression, nonlinearity is not significant and therefore the reinforcement effect of the hybrid is not significant, whereby uniform distribution of the reinforcing fibers is necessary for increasing the contact area between the reinforcing fibers and the fibers to be reinforced.

In contrast, in the case of the carbon fiber A, since nonlinearity is significant and thus the latent strain is also significant, the reinforcement effect of the reinforcing fibers is significant and thus sufficient even if the reinforcing fibers are distributed as bundles and are not uniformly distributed. Furthermore, by distributing the reinforcing fibers as bundles, damage to the reinforcing fibers does not occur during the production of a prepreg and thus deterioration of the properties of the prepreg due to hybridation does not occur.

In FIG. 4, the carbon fibers A that were subject to a compressive strain over the strain 1 are sustained until the whole test piece or the CFRP is broken at the strain 3. Accordingly, when the test piece that received a compressive strain over the strain 1 (but less than the strain 3) is subject to a tensile load, the original tensile strength and modulus remain. Thus, the CFRP using the prepregs of the present invention is capable of enduring repeated static loads.

Although in the above, carbon fibers A and B are combined in a prepreg while bundles of carbon fibers A and bundles of carbon fibers B are made, similar effects can be obtained by providing a CFRP produced by laminating prepregs of carbon fibers A and prepregs of carbon fibers B.

Here, the carbon fibers A and B are the same as defined and described for the prepreg and the CFRP previously appearing.

Figure 5:
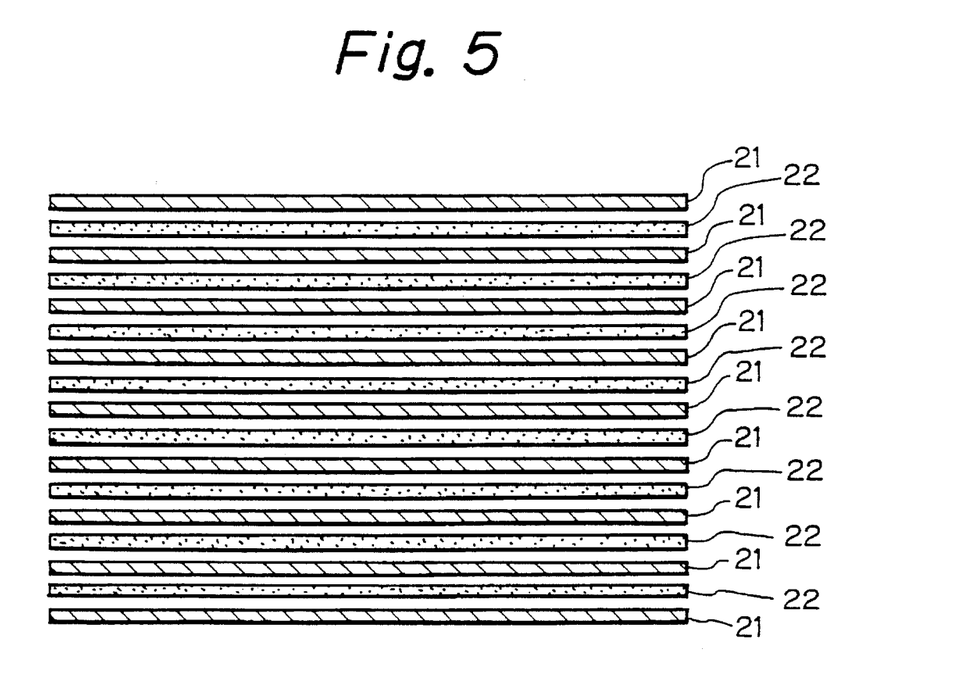
FIG. 5 schematically shows a formation of CFRP by combining two types of prepregs.

For example, as shown in FIG. 5, a predetermined number of unidirectional prepregs 22 of carbon fibers A and a predetermined number of unidirectional prepregs 21 of carbon fibers B are laminated in a predetermined combination at a predetermined alignment angle and then formed into a shape by heating and pressing using an autoclave or a hot press or the like.

The alignment angle of the prepregs during lamination is not particularly limited and may be selected depending on design, etc., including, for example, quasi-isotropic lamination, unidirectional, ±45° laminations.

It is preferred that the prepregs 22 and the prepregs 22 are arranged at the same angle for securing the effectiveness of the invention. Furthermore, it is preferred, from the viewpoint of reinforcement effectiveness, that both prepregs are as close as possible and respective prepregs are dispersed as much as possible.

Figure 6:
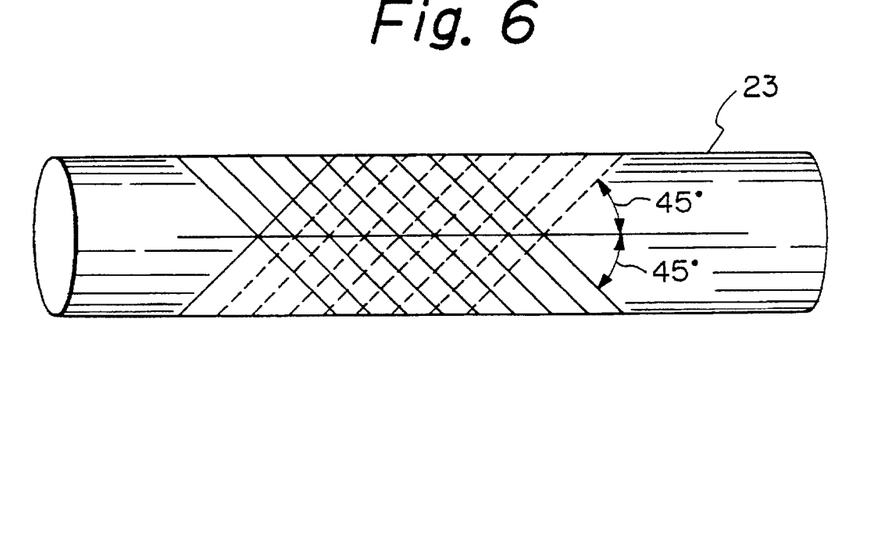
FIG. 6 shows fiber orientation of a pipe made of CFRPs.

For example, to form a pipe 23 that primarily receives a torsion effect and therefore must have high torsional rigidity, it is effective for the prepregs 22 to be wound ±45° to the pipe axis, as shown in FIG. 6. In this case, prepregs 21 are preferably wound adjacent to the prepregs 22, inside or outside, at the same alignment angle.

Also, for example, when three prepregs 21 and fourteen prepregs 22 are laminated with the same orientation, it is preferred that the prepregs 21 be arranged as both outermost layers and a central layer; though this is not essential and the effect can be obtained to some extent using other arrangements.

The amount of prepregs 21 and 22 arranged at the same alignment angle may be determined depending on the required performance.

The shape of the CFRP may be planer, cylindrical, or other three dimentional shapes obtained by the lamination of prepregs.

The used prepregs are not particularly limited as long as the carbon fibers are arranged in a single direction. The amount of fibers and the matrix resin, etc. may be optional depending on the design, production process, etc.

The used matrix resin may be the same as described before.

In this aspect of the present invention, a unidirectional CFRP using carbon fibers (A) can have an improved compressive strength and compression strain at failure in the direction of the fiber axis and the CFRP is capable of enduring repeated loads since the carbon fibers (A) are sustained without failure before the whole CFRP is broken.

In conventional hybrid CFRPs, the whole CFRPs are broken when the carbon fibers (A) are subject to a compression strain larger than the stain at failure of the carbon fibers (A) alone as a unidirectionally reinforced CFRP. Nevertheless, in the hybrid of the present invention, the CFRPs and the carbon fibers (A) therein exhibit a compression strain larger than the strain at the failure as a unidirectionally reinforced CFRP of the carbon fibers (A) alone.

The reasons for this are considered to be the same as previously described.

EXAMPLES

Example 1

Prepregs were produced using an apparatus as shown in FIG. 1.

In FIG. 1, 1 denotes a fiber bundle of 3000 pitch-based carbon fibers (A) having a modulus in tension of 600 GPa, a compressive strength as a unidirectional CFRP of 525 MPa and a compression strain at failure as a unidirectional CFRP of 0.2%, with all of these being measured in the direction of the fiber axis. The carbon fibers were subjected to a surface treatment for improving adhesion with a resin and to a sizing treatment.

2 denotes a fiber bundle of 6000 PAN-based carbon fibers (B) having a modulus in tension fo 480 GPa, a compression strength as a unidirectional CFRP of 900 MPa and a compression strain at failure as a unidirectional CFRP of 0.5%.

The fiber diameters and specific gravities of the above carbon fibers (A) and (B) are shown in Table 1.

TABLE 1

|  | Fiber diameter (μm) | Specific gravity |
|---|---|---|
| Carbon fiber (A) | 9.5 | 2.13 |
| Carbon fiber (B) | 5 | 1.87 |

The carbon fiber bundles 1 and 2 released from bobbins were aligned by a comb 7. The aligned fiber bundles were a combination of three carbon fiber bundles 2 to one carbon fiber bundle 1, as shown in FIG. 3, i.e., $r_{1/2}$ defined in the formula (1) is ⅓.

A 120° C. cure-type epoxy resin is impregnated to the aligned carbon fiber bundles to form a prepreg.

The obtained prepreg had a fiber weight of 150 g/m² and the fiber volume percent R defined in the formula (1) was 0.609.

The thus produced sixteen prepregs were laminated in a single fiber orientation and formed in an autoclave to obtain a unidirectional CFRP in the form of a planer plate 2.0 mm thick. The fiber volume percent was 60%.

The unidirectional CFRP was subject to a compression test in accordance with ASTM D3410A to show a compressive strength of 740 MPa and a compression strain at failure of 0.4%. This compressive strength is higher than that of a CFRP of carbon fibers (A) by 41% and this compression strain at failure is higher than that of a CFRP of carbon fibers (A) by 100%. Thus, satisfactory improvement of the compressive strength and compression strain at failure was attained.

Further, once 650 MPa of a stress was applied to the test piece, the test piece was removed from the test instrument but no damage or failure of the carbon fibers was observed.

Example 2

Six of the prepregs produced in Example 1 were formed by a sheet winding method at ±40° orientations into a pipe having an inner diameter of 10 mm, a thickness of 1.6 mm and a fiber volume content of 60%. The pipe was subject to a torsion test and the pipe was broken by compression failure in the direction of the fiber axis at a torque of 43.3 Nm.

For comparison, using prepregs of only carbon fiber bundles 1, a similar pipe was prepared by the sheet winding method at ±40° orientations. The pipe had an inner diameter of 10 mm, a thickness of 1.6 mm and a fiber volume percent of 60%. In a torsion test of this pipe, the pipe was broken at a torque of 26.6 Nm by compression failure in the fiber axis direction.

The torsion rigidities of the above two pipes were almost equal.

It is therefore concluded that the torsion strength of the pipe was (by 64%) improved significantly by combining carbon fibers (A) and (B) compared to the pipe of only carbon fibers (A).

Example 3

Prepregs were produced in a manner similar to that of Example 1.

In FIG. 1, 1 denotes a fiber bundle of 3000 pitch-based carbon fibers (A) having a modulus in tension of 500 GPa, a compressive strength as a unidirectional CFRP of 500 MPa and a compression strain at failure as a unidirectional CFRP of 0.35%; all of these being measured in the direction of the fiber axis. The carbon fibers were subjected to a surface treatment for improving adhesion with a resin and to a sizing treatment.

2 denotes a fiber bundle of 12000 PAN-based carbon fibers (B) having a modulus in tension of 230 GPa, a compression strength as a unidirectional CFRP of 1400 MPa and a compression strain at failure as a unidirectional CFRP of 1.25%.

The fiber diameters and specific gravities of the above carbon fibers (A) and (B) are shown in Table 2.

TABLE 2

|  | Fiber diameter (μm) | Specific gravity |
|---|---|---|
| Carbon fiber (A) | 9.5 | 2.09 |
| Carbon fiber (B) | 7 | 1.76 |

The carbon fiber bundles 1 and 2 released from bobbins were aligned by a comb 7. The aligned fiber bundles were a combination of one carbon fiber bundle 2 to one carbon fiber bundle 1, as shown in FIG. 2, i.e., $r_{1/2}$ defined in the formula (1) is 1.

The thus produced sixteen prepregs were laminated in a single fiber orientation and formed in an autoclave to obtain a unidirectional CFRP in the form of a planer plate 2.0 mm thick. The fiber volume percent was 60%.

The unidirectional CFRP was subject to a compression test in accordance with ASTM D3410A to show a compressive strength of 800 MPa and a compression strain at failure of 0.95%. This compressive strength is higher than that of a CFRP of carbon fibers (A) by 33% and this compression strain at failure is higher than that of a CFRP of carbon fibers (A) by 171%. Thus, satisfactory improvement of the compressive strength and compression strain at failure was attained.

Further, once 700 MPa of a stress was applied to the test piece, the test piece was removed from the test instrument but no damage or failure of the carbon fibers was observed.

Example 4

Figure 7:
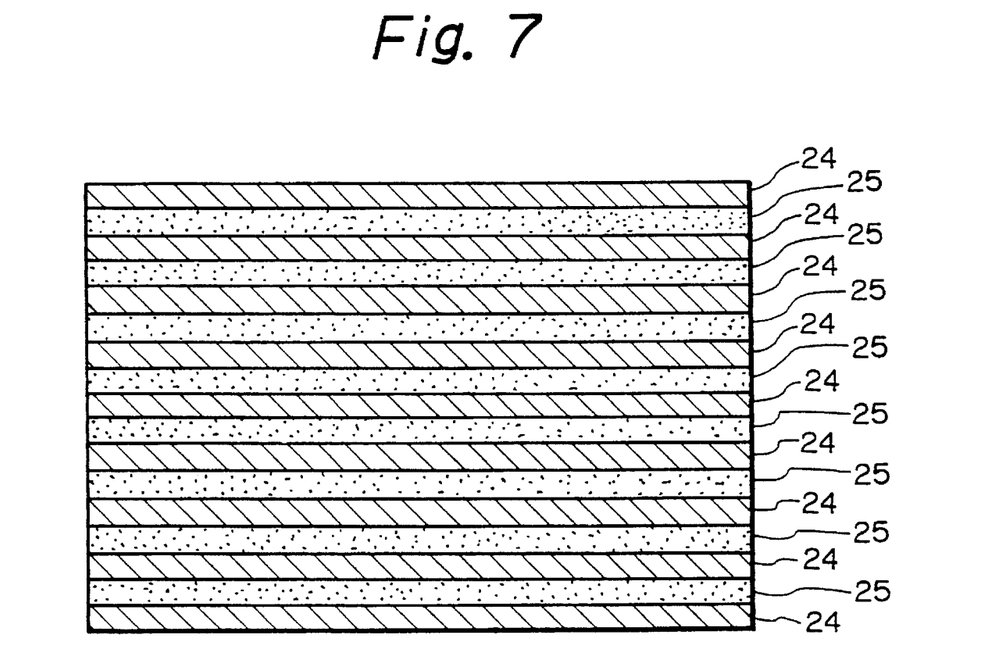
FIG. 7 shows a combination of prepregs in a CFRP in the Example.

A unidirectionally reinforced CFRP was prepared as shown in FIG. 7.

Prepregs 25 having a fiber weight of 125 g/m², a modulus in tension in the fiber axis direction of 600 GPa, a tensile strength in the fiber axis direction of 3300 MPa, a fiber diameter of 10 μm, a fiber volume percent of 60%, a compressive strength in the fiber axis direction as a unidirectionally reinforced CFRP of 525 MPa and a compression strain at failure in the fiber axis direction as a unidirectionally reinforced CFRP of 0.2%, and prepregs 24 having a fiber weight of 125 g/m², a modulus in tension of 480 GPa, a fiber diameter of 5 μm, a fiber volume percent of 60%, a compressive strength as a unidirectionally reinforced CFRP of 900 MPa and a compression strain at failure as a unidirectionally reinforced CFRP of 0.5%, were prepared.

As shown in FIG. 7, eight prepregs 25 and nine prepregs 24 were alternately laminated in a single fiber orientation and formed into a unidirectionally reinforced CFRP. The matrix resin was an epoxy resin curable at 140° C. for both types of prepregs 24 and 25. The formed CFRP had a fiber volume content of 60%.

The unidirectional CFRP was subject to a compression test in accordance with ASTM D3410A and displayed a compressive strength of 745 MPa and a compression strain at failure of 0.41%. This compressive strength is higher than that of a CFRP of carbon fibers (A) by 42% and this compression strain at failure is higher than that of a CFRP of carbon fibers (A) by 105%. Thus, a satisfactory improvement of the compressive strength and compression strain at failure was attained.

Further, once 650 MPa of a stress was applied to the test piece, the test piece was removed from the test instrument but no damage or failure of the carbon fibers was observed.

Example 5

Eight of the prepregs 24 and six of the prepregs 25 produced in Example 4 were formed by a sheet winding method at ±40° orientations into a pipe having an inner diameter of 10 mm, a thickness of 1.6 mm and a fiber volume content of 60%. The pipe was subjected to a torsion test and the pipe was broken by compression failure in the direction of the fiber axis at a torque of 44 Nm.

For comparison, using twelve prepregs 25, a similar pipe was prepared by the sheet winding method at ±40° orientations. The pipe had an inner diameter of 10 mm, a thickness of 1.6 mm and a fiber volume percent of 60%. In a torsion test of this pipe, the pipe was broken at a torque of 26.5 Nm by compression failure in the fiber axis direction.

The torsion rigidities of the above two pipes were almost equal.

It is therefore concluded that the torsion strength of the pipe was (by 67%) improved significantly by combining carbon fibers (A) and (B) compared to the pipe of only carbon fibers (A).

Example 6

A unidirectionally reinforced CFRP similar to one in Example 4 was prepared.

Prepregs 25 having a fiber weight of 125 g/m², a modulus in tension in the fiber axis direction of 500 GPa, a tensile strength in the fiber axis direction of 3200 MPa, a fiber diameter of 10 μm, a fiber volume percent of 60%, a compressive strength in the fiber axis direction as a unidirectionally reinforced CFRP of 500 MPa and a compression strain at failure in the fiber axis direction as a unidirectionally reinforced CFRP of 0.35%, and prepregs 24 having a fiber weight of 125 g/m², a modulus in tension of 400 GPa, a fiber diameter of 5 μm, a fiber volume percent of 60%, a compressive strength as a unidirectionally reinforced CFRP of 1400 MPa and a compression strain at failure as a unidirectionally reinforced CFRP of 1.25%, were prepared.

As shown in FIG. 7, eight prepregs 25 and nine prepregs 24 were alternately laminated in a single fiber orientation and formed into a unidirectionally reinforced CFRP. The matrix resin was an epoxy resin curable at 140° C. for both types of prepregs 24 and 25. The formed CFRP had a fiber volume content of 60%.

The unidirectional CFRP was subject to a compression test in accordance with ASTM D3410A to show a compressive strength of 815 MPa and a compression strain at failure of 0.93%. This compressive strength is higher than that of a CFRP of carbon fibers (A) by 63% and this compression strain at failure is higher than that of a CFRP of carbon fibers (A) by 166%. Thus, a satisfactory improvement of the compresslye strength and compression strain at failure was attained.

Further, once 710 MPa of stress was applied to the test piece, the test piece was removed from the test instrument but no damage or failure of the carbon fibers was observed.

We claim:

1. A unidirectional prepreg comprising at least one bundle of (A) pitch-based carbon fibers and at least one bundle of (B) polyacrylonitrile-based carbon fibers arranged unidirectionally and adjacent to each other and a resin impregnated into said arranged at least one bundle of pitch-based carbon fibers (A) and at least one bundle of polyacrylonitrile carbon fibers (B); said pitch-based carbon fibers having a modulus in tension of not less than 400 GPa, a tensile strength of not less than 2000 MPa, a compressive strength as a unidirectionally reinforced composite material of 100 MPa to 800 MPa, and a fiber diameter of 4 μm to 15 μm, said polyacrylonitrile-based carbon fibers (B) having a modulus in tension of not less than 200 GPa, compressive strength and compression strain at failure as a unidirectionally reinforced composite material higher than those of said pitch-based carbon fibers (A), and a fiber diameter smaller than that of said pitch-based carbon fibers (A).

2. A prepreg according to claim 1 wherein said pitch-based carbon fibers (A) have a modulus in tension of not less than 450 GPa.

3. A prepreg according to claim 1 wherein said pitch-based carbon fibers (A) have a compressive strength of not less than 200 MPa.

4. A carbon fiber reinforced resin composite material comprising a laminate of unidirectional prepregs; each of said unidirectional prepregs comprising at least one bundle of (A) pitch-based carbon fibers and at least one bundle of (B) polyacrylonitrile-based carbon fibers arranged unidirectionally and adjacent to each other and a resin impregnated into said arranged at least one bundle of pitch-based carbon fibers (A) and at least one bundle of polyacrylonitrile carbon fibers (B); said pitch-based carbon fibers having a modulus in tension of not less than 400 GPa, a tensile strength of not less than 2000 MPa, a compressive strength as a unidirectionally reinforced composite material of 100 MPa to 800 Mpa, and a fiber diameter of 4 μm to 15 μm; said polyacrylonitrile-based carbon fibers (B) having a modulus in tension of not less than 200 GPa, a compressive strength and compression strain at failure as a unidirectionally reinforced composite material higher than those of said pitch-based carbon fibers (A), and a fibers diameter smaller than that of said pitch-based carbon fibers (A).

5. A carbon fiber reinforced resin composite material made of a laminate of unidirectional prepregs comprising (A) pitch-based carbon fibers and unidirectional prepregs comprising (B) polyacrylonitrile-based carbon fibers; said pitch-based carbon fibers having a modulus in tension of not less than 400 GPa, a tensile strength of not less than 2000 GPa, a compressive strength as a unidirectionally reinforced composite material of 100 MPa to 800 MPa, and a fiber diameter of 4 μm to 15 μm; said polyacrylonitrile-based carbon fibers (B) having a modulus in tension of not less than 200 GPa, a compressive strength and compression strain at failure as a unidirectionally reinforced composite material higher than those of said pitch-based carbon fibers (A), and a fiber diameter smaller than that of said pitch-based carbon fibers (A).

6. A process for producing a unidirectional prepreg, comprising arranging at least one bundle of pitch-based carbon fibers (A) and at least one bundle of polyacrylonitrile-based carbon fibers (B) adjacent to each other, and impregnating the thus arranged bundles of pitch-based carbon fibers (A) and polyacrylonitrile-based carbon fibers (B) with a resin, wherein said pitch-based carbon fibers (A) have a modulus in tension of not less than 400 GPa, a tensile strength of not less than 2000 MPa, a compressive strength as a unidirectionally reinforced composite material of 100 MPa to 800 MPa and a fiber diameter of 4 μm to 15 μm and said polyacrylonitrile-based carbon fibers (B) have a modulus in tension of not less than 200 GPa, a compressive strength and compression strain at failure as a unidirectionally reinforced composite material larger than those of said pitch-based carbon fibers (A), and a fiber diameter smaller than that of said pitch-based carbon fibers (A).

7. A process for producing a carbon fiber reinforced composite material comprising laminating prepregs as set forth in claim 1, and forming the obtained composite material.

8. A process for producing a carbon fiber reinforced composite material comprising laminating a combination of unidirectional prepregs containing pitch-based carbon fibers (A) and unidirectional prepregs containing polyacrylonitrile-based carbon fibers (B), and forming the obtained laminate into a shape, wherein said pitch-based carbon fibers (A) have a modulus in tension of not less than 400 GPa, a tensile strength of not less than 2000 MPa, a compressive strength as a unidirectionally reinforced composite material of 100 MPa to 800 MPa and a fiber diameter of 4 μm to 15 μm and said polyacrylonitrile-based carbon fibers (B) have a modulus in tension of not less than 200 GPa, a compressive strength and compression strain at failure as a unidirectionally reinforced composite material larger than those of said pitch-based carbon fibers (A), and a fiber diameter smaller than that of said pitch-based carbon fibers (A).

\* \* \* \* \*